United States Patent [19]

Lee, Jr.

[11] 3,955,546

[45] May 11, 1976

[54] FUEL HEAT GENERATOR FOR INTERNAL COMBUSTION ENGINES

[76] Inventor: Seth Lee, Jr., Rte. 1, Coats, N.C. 27521

[22] Filed: Feb. 4, 1975

[21] Appl. No.: 546,868

[52] U.S. Cl. .................. 123/122 E; 123/119 A; 123/122 AC; 123/122 AB; 165/52; 261/145
[51] Int. Cl.² ......................................... F02M 31/00
[58] Field of Search...... 123/119 A, 122 E, 122 AB, 123/133, 122 AC, 122 H, 34 A; 60/278, 298; 165/52; 261/145

[56] References Cited
UNITED STATES PATENTS

| | | | |
|---|---|---|---|
| 3,667,436 | 6/1972 | Reichhelm | 123/119 A |
| 3,788,292 | 1/1974 | Lee | 123/119 A |

*Primary Examiner*—Charles J. Myhre
*Assistant Examiner*—R.H. Lazarus
*Attorney, Agent, or Firm*—J. Gibson Semmes

[57] ABSTRACT

A system for gasifying a mixture of fuel, air and recycling exhaust gases for induction into an internal combustion engine, comprising means interconnected between extant fuel pump and engine carburetor to preheat the mixture by bleeding heat from a heat generator to the flow line between pump and carburetor for preheating said flow line and of utilizing the heating media in the carburetion process and optionally secondarily heating said carbureted mixture in the generator sequentially of introduction of the preheated fuel to the carburetor.

6 Claims, 4 Drawing Figures

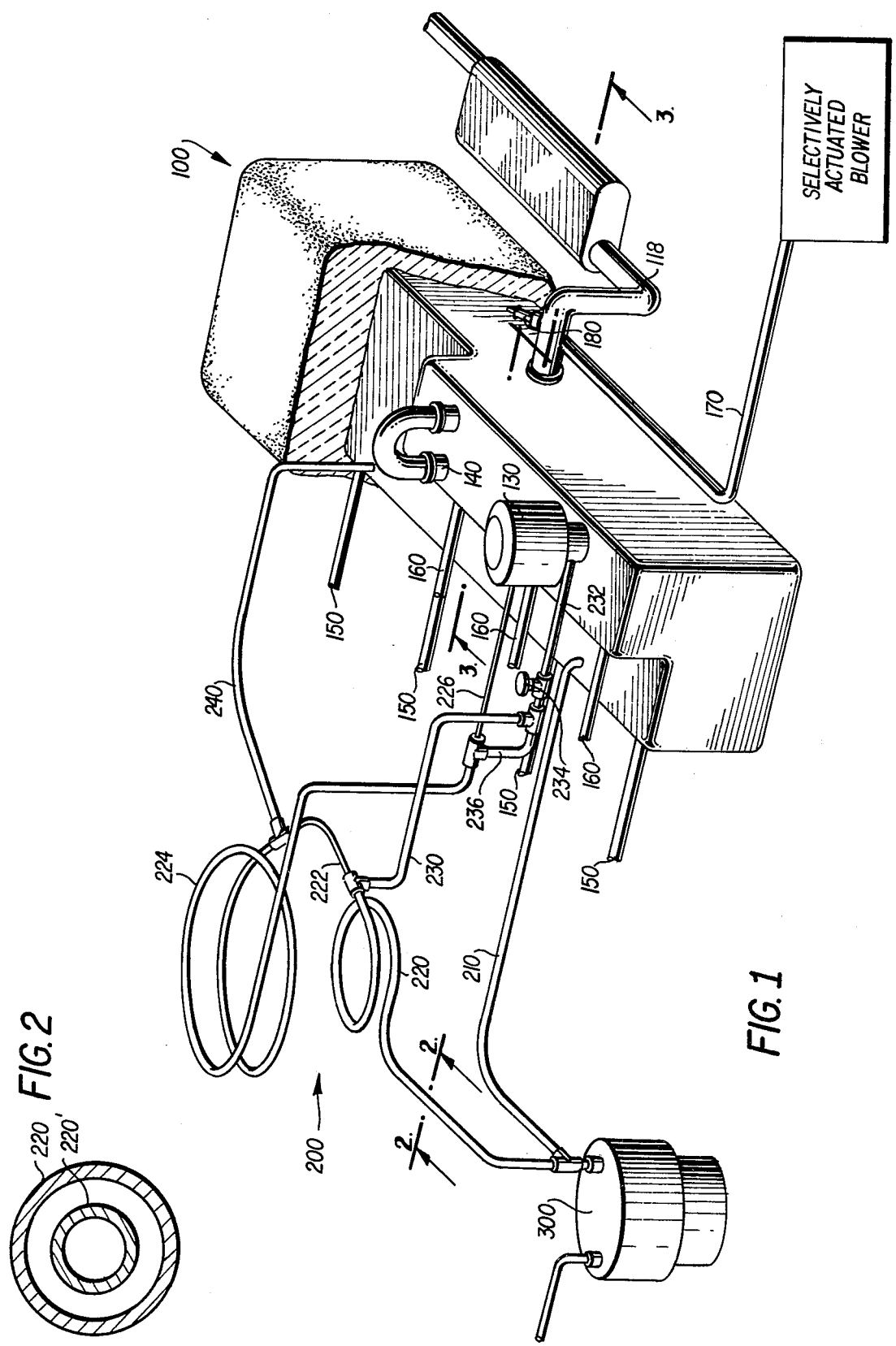

FUEL HEAT GENERATOR FOR INTERNAL COMBUSTION ENGINES

CROSS REFERENCE TO RELATED APPLICATIONS

This invention is an improvement over the invention disclosed in my application Ser No. 393,629 filed Aug. 31, 1973, now U.S. Pat. No. 3,911,881, and entitled COMBINED ENGINE EXHAUST AND FUEL GASIFICATION SYSTEM FOR AN INTERNAL COMBUSTION ENGINE and is related to my U.S. Pat. No. 3,788,292, dated Jan. 29, 1974, entitled FUEL HEAT EXCHANGER FOR INTERNAL COMBUSTION ENGINE AND METHOD OF USE.

FIELD OF THE INVENTION

This invention relates to intake and exhaust systems for internal combustion engines regardless of type in which some or all of the fuel and air mixture is heated by some or all of the exhaust gases from the engine and in which the gases of exhaust are recycled for most efficient combustion of the gasified fuel. The invention is universally adaptable to essentialy all gas or other fuel consuming engines, regardless of the work output thereof.

DESCRIPTION OF THE PRIOR ART

Engine designers have recognized for many years the value of using the exhaust system of the engine to heat the fuel mixture fed to the same engine. Early examples of such systems include Goodspeed U.S. Pat. No. 857,730 and Westendarp U.S. Pat. No. 858,046 wherein the raw fuel is pumped through a heat exchanger coil around which the exhaust gases from the engine are directed, to vaporize the fuel which is subsequently inducted into the engine with an appropriate amount of air. Other patents in this area include Dixon U.S. Pat. No. 1,148,892 and Coffman U.S. Pat. No. 1,267,185. See also in this connection Church U.S. Pat. No. 1,415,086 and the patents to Primakoff U.S. Pat. No. 2,836,161 wherein the fuel and air mixture is drawn into a first expansion chamber, thence into a second such chamber where it contacts the exhaust manifold precedent to flow into the engine. Unlike the invention of Reichhelm U.S. Pat. No. 3,667,436, the gasification herein is not totally dependent upon an admixture of engine exhaust products with the liquid fuel to gasify the same.

BRIEF DESCRIPTION OF THE DRAWINGS

FIG. 1 is a view in perspective of the invention.

FIG. 2 is a cross-section of the fuel line and heat line combination, taken along the lines 2—2 of FIG. 1.

DESCRIPTION OF THE PREFERRED EMBODIMENTS

Figure 3:
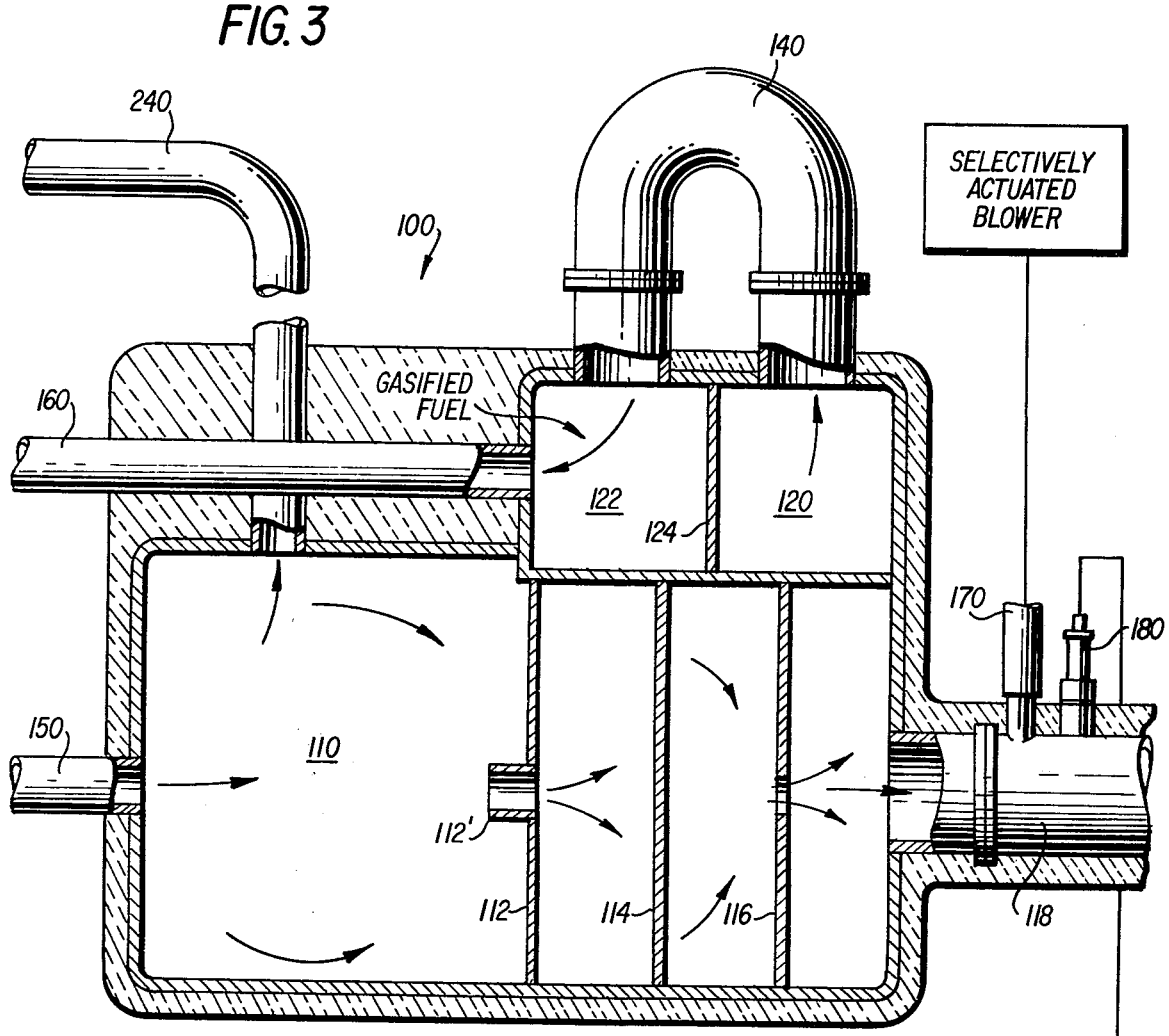
FIG. 3 is a vertical sectional view of the generator input and output taken along the lines 3—3 of FIG. 1.
Figure 4:
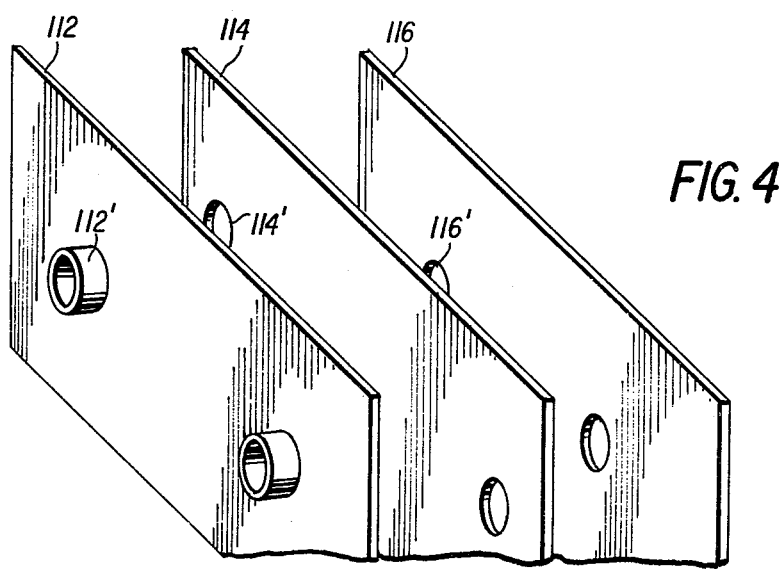
FIG. 4 depicts the generator baffles of FIG. 3 in perspective.

In its broadest sense, the invention comprises a fuel heat generator to preheat the fuel prior to carburetion, the heat being supplied in the first instance and in continuous operation by engine exhausts from an engine exhaust manifold. The generator 100 includes a generator chamber 110 which said chamber is divided by baffles 112, 114 and 116 into compartments, the respective compartments having heat conductive connection with the post-carburetion superposed chambers 120 and 122, said chambers being divided by a sealed wall 124. The generator is adapted to the feeding of exhaust gases from an engine exhaust manifold through the generator input conduits 150. It will be noted that with respect to the generator chambers 110, the random spacing of the apertures shown is such as to insure that incoming exhaust gases from the conduit 150 are impeded in their flow from baffle to baffle and precedent to exhaust through the element 118 whereby maximum exposure of the superposed chambers 120 and 122 may be obtained for the secondary phase of gasification, optionally employed herein.

With respect to the primary means of preheating the engine fuel, reference is made to the tubular complex 200, interposed between generator 100 and fuel pump 300. The complex 200 comprises essentially a raw fuel feed line 200' which is encompassed substantialy throughout its entire length of the tubular heat jacket 220. Reference herein is made to FIG. 2.

With reference to section 210 of the heat line, said section does not include the raw fuel feed line 220, but at its junction therewith, encompasses the fuel feed line to create the concentric arrangement of FIG. 2. Accordingly and with reference to FIGS. 1 and 3 it will be noted that by means of connection of the heating conductor 210 with the combined fuel feed and heating jacket concentric arrangement of 220 and 220', shown in FIG. 2 that fuel emanating from the pump will instantly be subject to a preheating as it passes through said conduit and connections 222, 224 and 226. Fuel conduit section 222 is not jacketed but rather is interposed between heat jacketed sections 220 and 224. Heat from the generator conduit 240 may further gasify the fuel passing through the section 224 which then subsequently is introduced via connection 226 to the upper portion of the carburetor 130, as shown.

The fuel circuit is thus from the pump 300 through jacketed conduit 220, thence by connection with unjacketed connector 222 to the auxiliary conduit 224 thence to the carburetor, connecting conduit 234. Heat brought to the generator 100 via conductors 150, follows in part two separate paths, initially and a combined path finally. These paths include the path defined by conductor 210 and 220 and 230 on the one hand, thence through the carburetor connector 232. By means of the supplemental connector 240, emanating from the chamber, heat from the generator is adapted to pass into a supplemental fuel heating system 224, thence via conductor 236, leaving exposed the fuel line 226 and joining the connector 232 which is selectively valve controlled by the valve 234 as shown. The sources of heat from the heat generator 100 to the fuel line are therefore two in number and comprise initially conductors 210 and 240, said conductors combining immediately adjacent valve 234 to feed into the connector 232 at the base of the carburetor 130. This system may be adapted to a conventional internal combustion engine carburetor or to a modified post-carburetion system hereinafter described.

Optionally, the carburetor 130 is shown to be disposed in connection with input gasification chamber 120, which said chamber has connection via the trap 140 with the outlet chamber 122 whereby the gasified fuel from the carburetor may pass through said trap for entrapping ungasified liquids.

By reference to the elements 170 and 180, having connection with exhaust 118, it will be appreciated that as in my patent application Ser. No. 393,629 now U.S. Pat. No. 3,911,881 aforesaid, a blower system 170 may be selectively actuated by throttle position or engine speed to create desired backpressure to the system, enhancing thereby the flow exhaust gas heat through the fuel heating system 200, above described. A suitable solenoid valve may be provided in the blower conduit which may be set to open in response to engine speed or throttle position, simultaneously with the blower actuation and otherwise to prevent air from being drawn through the blower when the blower is not in use. The exhaust header 118 may also include an auxiliary sparkplug 180 installed in its wall and adapted to fire in accordance with a predetermined cycle, to make certain that all gases of combustion have been ignited.

By preselected control, the engine on warm-up may actuate the exhaust blower to increase exhaust pressure from the engine manifold. These exhaust gases are conducted from the exhaust manifold, with or without blower assist, to the generator via conductors 150 whereupon they seek outlet in the heater tubes 210 and 240 to twice preheat the fuel from the lines 220 on the one hand and 224 on the other hand. The combined gases of exhaust enter by preselected valvular control, the carburetor simultaneously with the preheated fuel and normal air intake. No other modification to the conventional carburetor is required. The combined carbureated fuel-air and gases of exhaust mixture seeks outlet via the secondary heating chambers 120 – 122, connected by liquid trap 140.

The system 200 without secondary heating results in an increased efficiency of approximately one third over conventional engines and with the secondary system 120 - 140 - 122 results in even greater efficiency viz: in a six cylinder 235 cubic inch vehicular engine on regular gas, the vehicle achieved 24 – 27 miles per gallon under the respective primary and combination primary and secondary heating systems. Other advantages achieved by virtue of the gasification and recycling of exhausts include: decreased emissions; increased life to exhaust systems; increased engine life; increased horsepower; operation of high horsepower engines with lowest fuel octane rating.

I claim:

1. The combination with an internal combustion engine having fuel pump, carburetor input and output means and exhaust manifold, of fuel gasification apparatus comprising:

A. a heat generator, said generator having connection with the exhaust manifold whereby the exhaust manifold may provide heated gases of exhaust to the generator, said heat generator being also interconnected with the fuel pump and carburetor;
   B. a fuel conduit having at least two adjoining sections connecting the fuel pump to the carburetor whereby to supply the carburetor with fuel; and
   C. at least two corresponding heat flow conduit sections emanating from the generator and encompassing the respective fuel conduit sections in heat exchange relation thereto, whereby to heat the fuel during its course from the pump to the carburetor, said heat flow and fuel conduits having connection with the carburetor in complemental disposition to each other, whereupon generation of exhaust from the engine the exhaust heat flow passes into said heat flow conduit sections resulting in the liquid fuel being preheated and gasified, and to the carburetor to combine with air in the carburetion mode.

2. The apparatus according to claim 1, wherein the respective heat flow conduits have output ends at the generator and input ends adjacent the carburetor, the output ends of the respective heat flow conduits joins together adjacent the carburetor to feed the carburetor and means thereon adjacent the carburetor to regulate the flow of the exhaust gases to said carburetor.

3. The apparatus according to claim 1, wherein the carburetor outlet is in heat exchange disposition relative to the generator, said generator including at least one post-carburetion chamber connecting the carburetor to the fuel intake of the engine.

4. The apparatus according to claim 2, wherein the carburetor outlet is in heat exchange disposition relative to the generator, said generator including at least one post-carburetion chamber connecting the carburetor to the fuel intake of the engine.

5. The apparatus according to claim 3, wherein the post-carburetion chambers are two in number and trap means connecting the respective post-carburetion chambers exteriorly of the post-carburetion chambers, effecting thereby a simultaneous transfer of the gasified fuel from the carburetor while condensing ungasified liquids thereof.

6. The apparatus according to claim 5, wherein the respective heat flow conduits have output ends at the generator and input ends adjacent the carburetor, the output ends of the respective heat flow conduits joining together adjacent the carburetor and means thereon to regulate the flow of exhaust gases adjacent said carburetor.

* * * * *